United States Patent [19]

Cheron

[11] Patent Number: 5,414,334
[45] Date of Patent: May 9, 1995

[54] CONTROL DEVICE FOR AN ASYNCHRONOUS ROLLER-BLIND MOTOR

[75] Inventor: Eric Cheron, Bonneville, France

[73] Assignee: Somfy, Cluses, France

[21] Appl. No.: 104,774

[22] Filed: Aug. 10, 1993

Related U.S. Application Data

[63] Continuation-in-part of Ser. No. 804,120, Dec. 6, 1991, abandoned.

[30] Foreign Application Priority Data

Dec. 28, 1990 [FR] France ................... 90 16462

[51] Int. Cl.[6] ............................................. H02P 19/00
[52] U.S. Cl. .................................... 318/284; 318/466; 160/DIG. 17
[58] Field of Search ..................... 318/280–285, 318/256, 264, 266, 480, 466, 685, 696, 467, 267; 49/28, 118, 43, 100, 139, 141; 160/5, 7, 49, 291, 310, DIG. 17, 166.1; 296/223, 216

[56] References Cited

U.S. PATENT DOCUMENTS

| | | | |
|---|---|---|---|
| 4,134,050 | 1/1979 | Sibalis | 318/267 |
| 4,161,679 | 7/1979 | Kohn et al. | 318/685 |
| 4,369,399 | 1/1983 | Lee et al. | 318/467 |
| 4,445,075 | 4/1984 | Fry | 318/282 X |
| 4,471,275 | 9/1984 | Comeau | 318/286 |
| 4,544,866 | 10/1985 | Clemmons et al. | 318/469 X |
| 4,864,201 | 9/1989 | Bernot | 49/25 X |
| 4,958,112 | 9/1990 | Zerillo | 318/280 |
| 4,962,565 | 10/1990 | Ingermann et al. | 15/302 |
| 4,965,498 | 10/1990 | Yokata | 318/468 |

*Primary Examiner*—Jonathan Wysocki
*Attorney, Agent, or Firm*—Laff, Whitesel, Conte & Saret, Ltd.

[57] ABSTRACT

The present invention provides controls for driving roller blinds, rolling shutters and doors. The controls include a two directional motor, a control panel, switches, power supply, and a logic processing unit which are all interconnected to allow the user to partially or fully raise and lower the blinds. The direction of the blinds can be changed at any time and also stopped at any time.

4 Claims, 2 Drawing Sheets

CONTROL DEVICE FOR AN ASYNCHRONOUS ROLLER-BLIND MOTOR

This is a continuation-in-part of my application No. 07/804,120 filed Dec. 6, 1991, abandoned.

The subject of the present invention is a control device for an asynchronous motor having two directions of rotation used for driving a roller-blind, rolling shutter, door or similar objects, comprising a control point equipped with Raising, Lowering and Stop contacts which can be operated manually and whose operation ensures the rotation of the motor in the desired direction and its stopping respectively.

PRIOR ART

In most known installations comprising a roller-blind, a rolling shutter or a door controlled by an asynchronous motor having two directions of rotation, the windings corresponding to each of the directions of rotation are connected to the electrical power supply by the intermediary of contacts of the control point marked by the words Raising and Lowering. It is therefore important that, during the wiring, the Raising and Lower-ing contacts are each connected to the winding for which the supply of power results in a rotation of the motor in such a way as to actually cause a raising or a lowering of the roller-blind, of the rolling shutter or of the door. Now, the actual raising and lowering of the roller-blind, of the rolling shutter or of the door does not depend only on the correct marking of the conductors when connecting up but also on the orientation of the motor. This motor can in fact be in one of two symmetrical positions, depending on whether it is installed on one side or the other side of the embrasure in which the roller-blind, the shutter or the door is mounted, the effect obtained being either a raising or a lowering, depending on the position of the motor, for the same direction of rotation of the latter.

This represents a constraint which is difficult to manage. It is generally necessary to carry out a preliminary powering up and a test before proceeding with the final connection. Such an operation is a waste of time and furthermore it is not always possible to carry out easily because of the sometimes very difficult access to the motor.

Further, certain installations are known in which the correct power supply for the windings of the motor is provided by remote controlled contacts located in the motor itself and controlled by built-in electronics which generally also manage the automatic stoppings of the motor. The contacts are remote controlled from a control box located at the control point. Access to the contacts, for repair purposes, is therefore impossible without dismantling the motor and consequently without also dismantling a part of the installation. Furthermore, a large amount of wiring is necessary between the control point, often distant from the motor, and the motor, this wiring also comprising the power supply for the motor.

SUMMARY OF THE INVENTION

The purpose of the present invention is to produce a control device overcoming the disadvantages of the known installations, that is to say a control device capable of being used with a conventional motor, requiring minimum wiring and having great flexibility in its possibilities of installation.

For this purpose, the control device according to the invention comprises, between the control point and the motor, a control box and a power supply unit containing a logic processing unit, in which a program for reversing the direction of rotation of the motor is stored, and means of switching controlled by the logic processing unit for the power supply of one or other of the windings of the motor, the control point comprising means of implementing the reversal program.

The control box can be placed at the most appropriate place, generally in the proximity of the motor. The wiring between the control point and the control box can consist in a single cable with four conductors of small cross-section. Integration of the control box with the motor is possible without further provisions. The installation has great flexibility.

BRIEF DESCRIPTION OF THE DRAWINGS

An embodiment of the device according to the invention will be described with reference to the appended drawing in which.

DESCRIPTION OF THE PREFERRED EMBODIMENT

Figure 1:
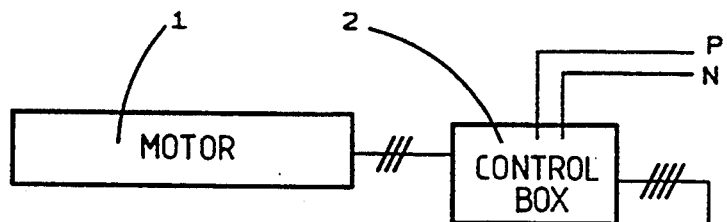
FIG. 1 is a general block diagram of an installation comprising a motor.

The installation shown as a block diagram in FIG. 1 comprises an asynchronous motor 1 having two directions of rotation whose three input terminals are connected by three conductors to a control box 2 which is itself connected by four wires to a control point 3 fitted with four push buttons M, D, S, and IS. The push button M operates a Raising contact, the push button D operates a Lowering contact, the push button S operates a contact having on the one hand the usual function of a Stop contact and on the other hand an additional function Depressing the stop contact and the reverse installation contact IS simultaneously, causes the lowering and raising contacts to operate in a reverse order. The reverse order being that the raising and lowering contacts will upon subsequent activation always turn the motor in a direction opposite from the direction they turned the motor prior to activating the reverse installation contact. As usual, P and N denote the main power supply.

The control box 2 houses a logic processing unit (LPU) 4 comprising a microcomputer 5, on this occasion an INTEL 8051 microcomputer with its ROM and RAM memories associated with an EPROM memory. The microcomputer 5 is supplied by the intermediary of a stabilized power supply 6 and it is connected, on the one hand, to the control point 3 by an "operating" interface 7 and, on the hand, to the motor 1 by an I/O interface 8.

Figure 3:
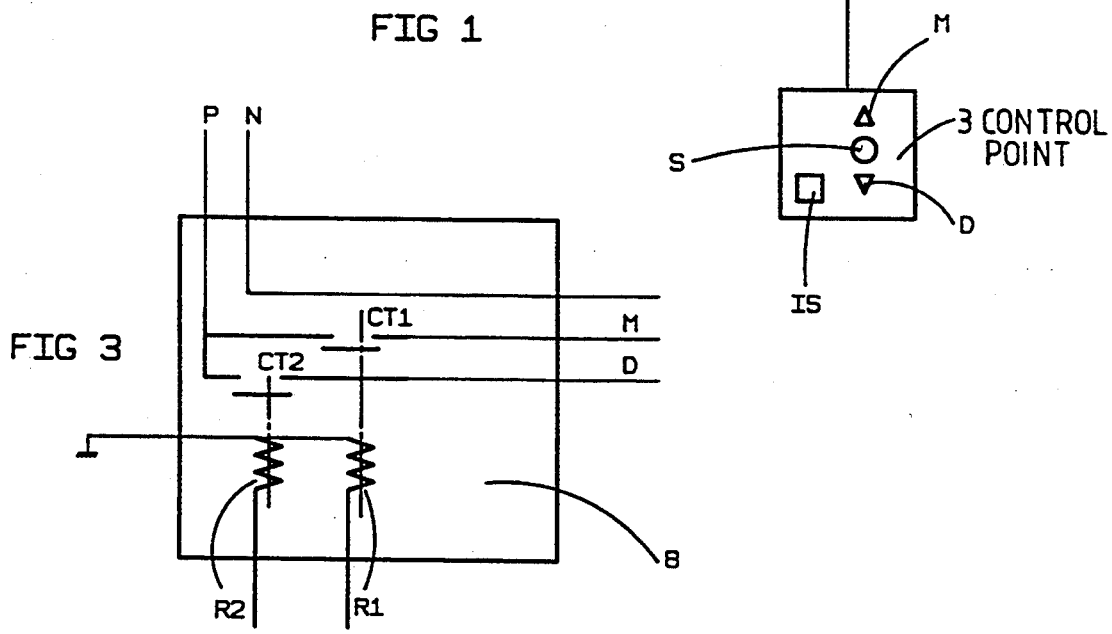
FIG. 3 shows the Input/Output interface on the motor side.
Figure 2:
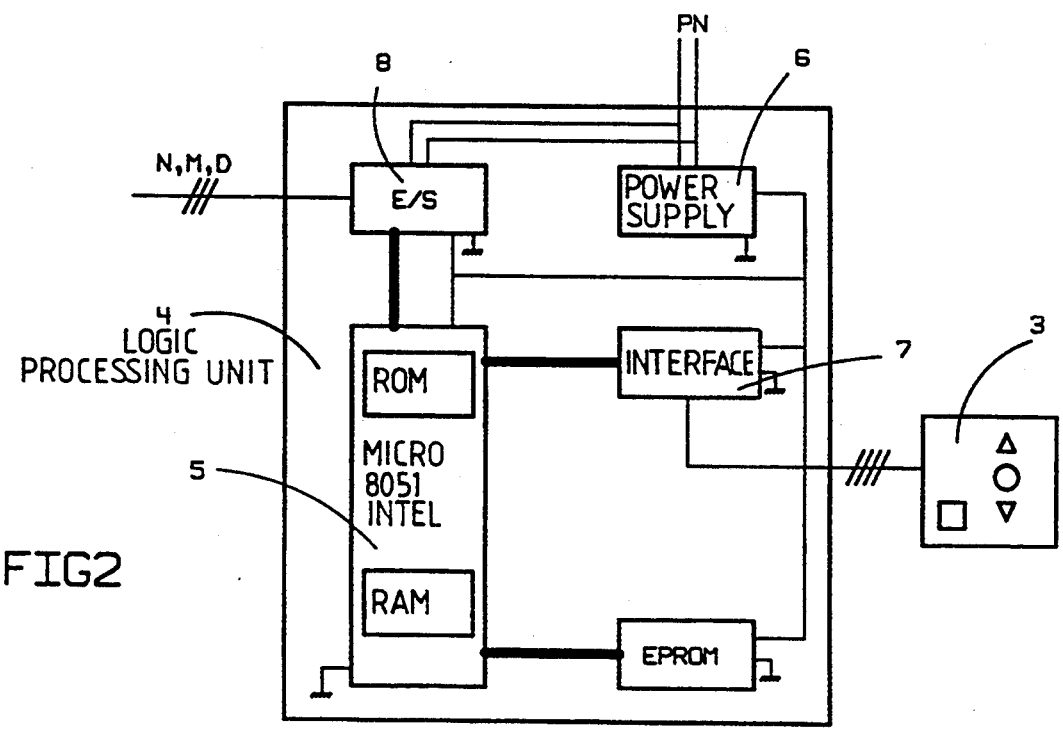
FIG. 2 shows the block diagram of the logic processing unit.

The interface 8 is shown in greater detail in FIG. 3. It comprises two relays R1 and R2 respectively operating a contact CT1 and CT2. The relays R1 and R2 are controlled by the microcomputer 5. The closing of the contact CT1 has the effect of connecting the phase P of the mains to the Raising conductor M, while the closing of the contact CT2 has the effect of connecting this same phase to the Lowering conductor D going to the motor 1. The contacts CT1 and CT2 therefore ensure the rotation of the motor 1 in one direction or in the other.

The main reversal program is stored in the ROM memory.

Figure 4:
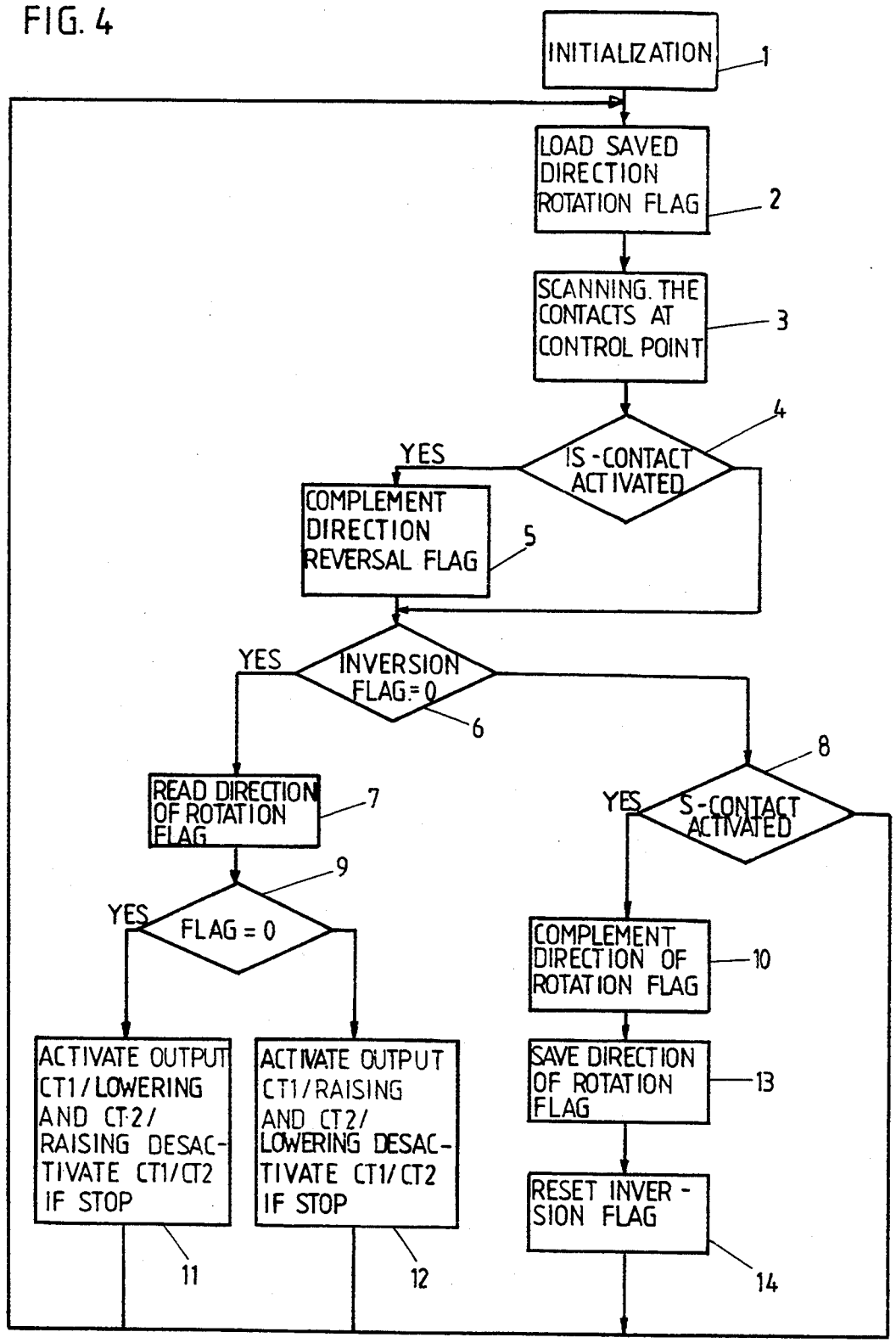
FIG. 4 shows the flowchart of the program for reversing the direction of rotation of the motor.

The flowchart of the programs of the microcomputer 5 is shown in FIG. 4.

Instruction 11 is an initialization instruction.

Instruction 12 is an instruction for loading the saved direction of rotation flag.

Instruction 13 is an instruction for scanning the contacts of the control point 3.

Instruction 14 tests the state of the contact IS.

Instruction 15 is an instruction for the complementing of the direction reversal flag.

Instruction 16 tests if the reversal flag is equal to zero.

Instruction 17 is an instruction to read the direction of rotation flag.

Instruction 19 tests if the flag is equal to zero.

Instruction 21 is an instruction to activate the output of the microcomputer 5 corresponding to the contact CT1 with the Lowering contact and of the contact CT2 with the Raising contact or to deactivate the contacts CT1 and CT2 if the contact S is operated alone, which corresponds to a stop command.

Instruction 22 is an instruction to activate the output of the microcomputer 5 corresponding to the contact CT1 when the Raising contact of the control point is activated and the corresponding output of the contact CT2 when the Lowering contact of the control point is activated or to deactivate CT1 and CT2 if the contact S is activated alone.

Instruction 18 is an instruction for testing if the contact S is activated.

Instruction 20 is an instruction for the complementing of the direction of rotation flag.

Instruction 23 is an instruction to save the direction of rotation flag.

Instruction 24 is an instruction to reset the reversal flag to zero.

The functioning of the device is as follows:

On powering up, the device is initialized by instruction 11. In particular, the counter of the microcomputer 5 and the flag are reset to zero.

Instruction 12 loads the direction of rotation flag into the RAM memory, this direction of rotation having been previously saved by instruction 23, then calls instruction 13 which scans the contacts of the control point 3.

In the absence of any action on the contact IS, instruction 14 calls instruction 16 which tests that the reversal flag=0. Instruction 16 calls instruction 17 which reads the direction of rotation flag, then instruction 19 tests its value.

If the flag=0, instruction 19 calls instruction 21 which is the subroutine for activating the contact CT1 if the Lowering contact D is operated, for activating the contact CT2 if the Raising contact M is operated and for deactivating the contacts CT1 and CT2 if the stop contact S is operated. The program loops back.

If the user notices that the effect produced by operating the Raising M/Lowering D contacts does not correspond with the desired direction, he then operates the contact IS. In this case, instructions 12 and 13 run as before. Instruction 14 tests that the contact IS is activated and calls instruction 15 which complements the reversal flag to 1.

The latter being at 1, instruction 16 calls instruction 18.

If the user operates the contact S at that moment, instruction 18 calls instruction 20 which complements the value of the corresponding flag (here at 1) and then calls instruction 23 which saves this value in the EPROM memory.

Instruction 24 resets the reversal flag to zero and the program loops back.

In the absence of action on the contact IS, instructions 11, 12, 13, 14, 16 and 17 run as previously described and then instruction 19 tests that the flag=1 and calls instruction 22 which is the subroutine inverse to 21. The contact CT1 is activated with the Raising contact M and the contact CT2 is activated with the Lowering contact D.

If the operator does not operate the contact S at the end of instruction 16 testing that the reversal flag=1, the program loops back until the user operates this contact S allowing the reversal of the direction of rotation, or the contact IS, retaining the current direction of rotation.

Since the value of the direction of rotation flag is reloaded at each loop of the program by instruction 12, the current direction of rotation is retained even after a failure of the mains supply.

The following two examples illustrate the use of the present invention.

EXAMPLE 1

Let us suppose that the blind does not roll down when the operator actuates the contact D. In this event the operator operates simultaneously the contacts IS and S. Then the programm instruction 14 tests that the contact IS is activated and calls instruction 15 which complements the reversal flag to 1. Instruction 15 calls instruction 16 which tests that the reversal flag is not equal to zero so that instruction 16 is called which tests that the contact S is activated. Instruction 18 calls then instruction 20 which complements the direction of rotation flag. The new direction of rotation is then memorized in the RAM of the microcomputer and at the next time the operator (or the user) actuates the contact D the blind will correctly roll down.

Additionally the value of the direction of rotation is is saved in the EPROM memory.

If the blind correctly rolls down when the contact D is actuated and rolls up when the contact M is actuated, the operator has no reason to actuate the contact 15. Moreover the user should not actuate the contact IS and this contact is preferably masked so that it could not be untimely actuated.

EXAMPLE 2

Let us suppose that the blind does correctly roll down when the operator actuates the contact D. The blind is then ready for use. Suppose that the roller-blind is rolled up and that the user wants that the blind rolls down.

The user actuates the contact D. The programm being running instruction 14 test that the contact IS is not actuated and calls instruction 16 which tests that the reversal flag=0. Instruction 16 calls then instruction 17 which reads the direction of rotation flag, loaded in the RAM. The value of this flag may be 1 or 0 depending on the preliminary setting by the installator. Assuming that the flag=0, then instruction 19 calls instruction 21 which activates the contact CT1 and the blind rolls down.

I claim:

1. A control device for an asynchronous motor having two directions of rotation used for driving roller blinds, rolling shutters and doors, comprising a control panel (3) equipped with a manually operated raising contact (M), a lowering contact (D), a stop contact (S) and a reverse installation means.

- a two directional motor (1),
- a control box and a power supply unit containing a logic processing unit, switch means connected to said power supply and said motor,
- said logic processing unit having memory means which memorizes the direction of rotation of said motor,
- said logic processing unit connected to said control panel raising contact, said power supply and said switch means wherein when said raising contact is activated, said power supply and switch means are activated to turn the motor in a first direction whether or not the motor is stopped or moving in a second direction,
- said logic processing unit connected to said control panel lowering contact, said power supply and said switch means wherein when said lowering contact is activated, said power supply and switch means are activated to turn the motor in said second direction whether or not the motor is stopped or moving in said first direction,
- said logic processing unit connected to said control panel stop contact, said power supply and said switch means wherein when said reverse installation means is activated a reverse order is identified by the logic processing unit and memorized; wherein a subsequent activation of the raising contact will cause the motor to turn in said second direction, until another activation of said reverse activation means, whether or not the motor is stopped or moving in said first direction and; wherein a subsequent activation of the lowering contact will cause the motor to turn in said first direction whether or not the motor is stopped or moving in said second direction until another activation of said reverse activation means.

2. The control device of claim 1 wherein said reverse means includes said control panel having a reverse installation contact (IS), connected to said power supply and said switch means, wherein when said stop contact and said reverse installation contact are activated, said power supply and switch means are activated and a reverse order is identified by the logic processing unit and memorized; wherein thereafter a subsequent activation of the raising contact will cause the motor to turn in said second direction whether or not the motor is stopped or moving in said first direction and; activation of the lowering contact will cause the motor to turn in said first direction whether or not the motor is stopped or moving in said second direction until there is another activation of said stop contact and said reverse installation contact.

3. The control device as claimed in claim 1, wherein the logic processing unit comprises a microcomputer (5), an interface (7) on the control point side and an interface (8) on the motor side comprising two switches (R1, R2) controlled by the microcomputer in order to provide the power supply of one or other of the terminals of the motor determining its direction of rotation.

4. The control device as claimed in claim 3, wherein the logic processing unit comprises means (EPROM) of saving the direction of rotation.

* * * * *